United States Patent Office 3,461,892
Patented Aug. 19, 1969

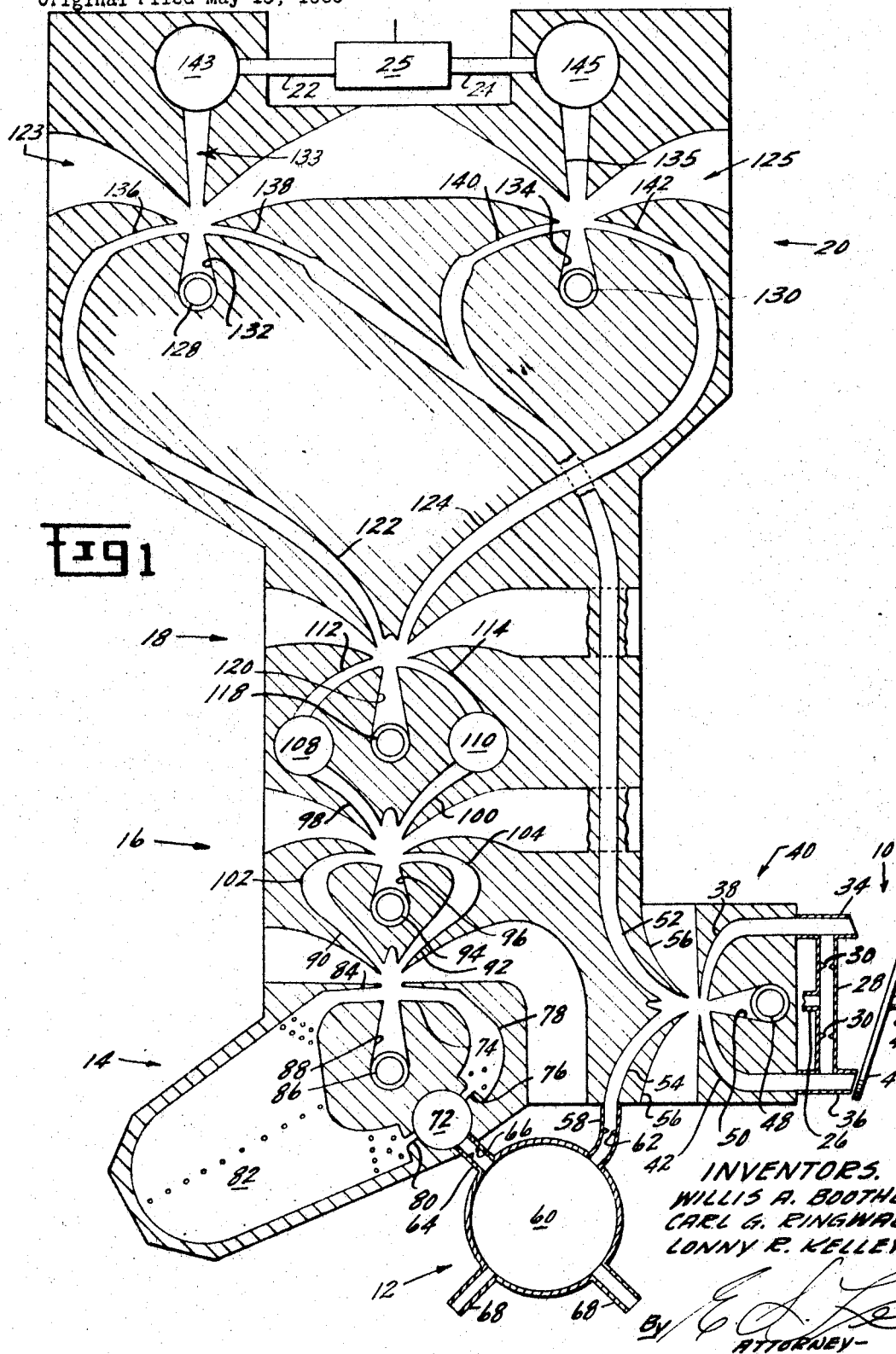

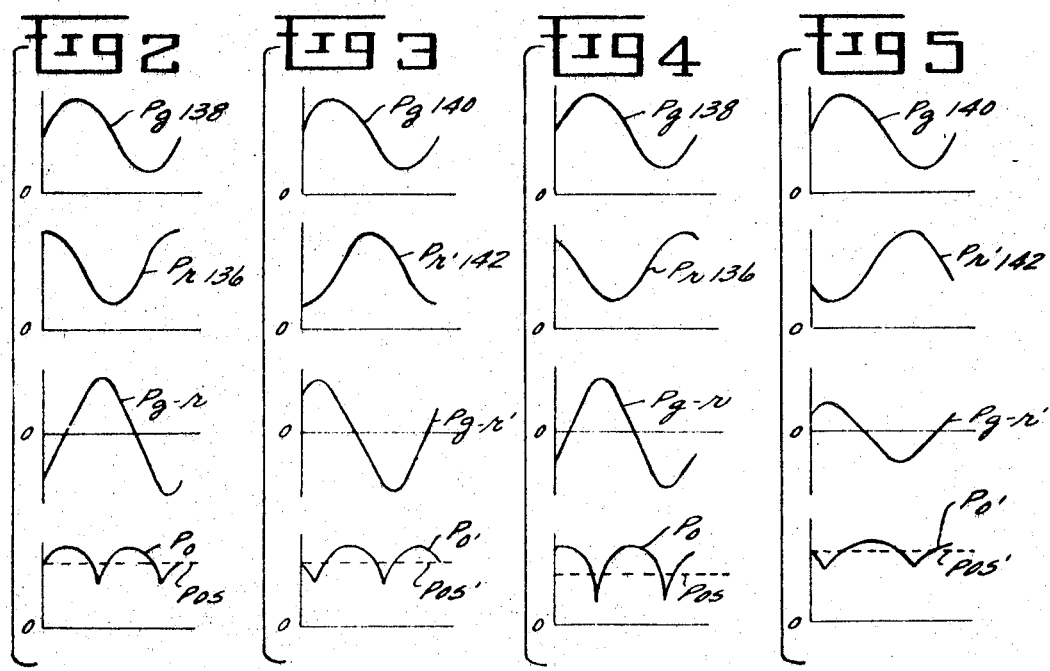
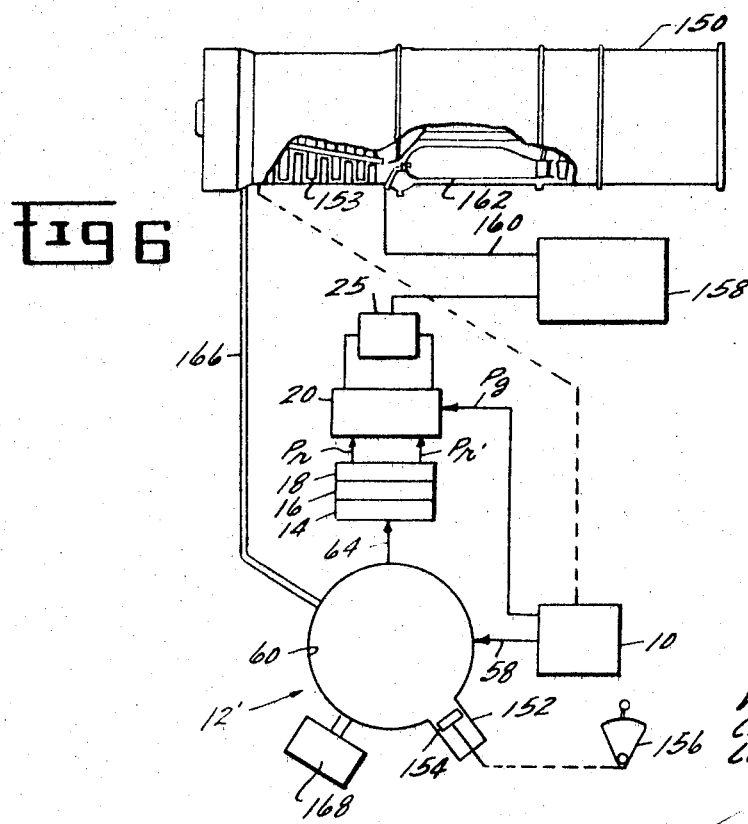

3,461,892
FLUID CONTROLS PARTICULARLY FOR TURBINE ENGINES
Willis A. Boothe and Carl G. Ringwall, Scotia, and Lonny R. Kelley, Schenectady, N.Y., assignors to General Electric Company, a corporation of New York
Continuation of application Ser. No. 457,099, May 19, 1965. This application July 25, 1968, Ser. No. 751,005
Int. Cl. F02c *9/08;* F15c *1/08*
U.S. Cl. 137—18                                   6 Claims

ABSTRACT OF THE DISCLOSURE

The disclosure shows a speed control for a gas turbine engine wherein a fluidic speed signal is generated proportionate to engine rotor speed. This speed signal is employed in combination with a resonator to generate a reference signal. The phase relationships of the speed signal and the reference signal are compared to generate an output control signal which is employed to regulate fuel supply to bring the rotor speed to a given value, dependent upon the frequency of the resonator. The frequency of the resonator is controlled by a throttle to obtain a desired speed. The speed of the rotor may be automatically compensated by flushing compressor inlet air through the resonator. The phase relationship comparison is attained through the use of fluidic elements having a pair of control ports on opposite sides of a power stream and a single receiver aligned with the normal axis of the power stream.

---

This application is a continuation of Ser. No. 457,099, filed May 19, 1965, and now abandoned.

The present invention relates to improvements in fluid controls for gas turbine engines and in its broader aspects to fluid controls having general utility.

One object of the invention is to make available the recognized advantages of fluid controls for controlling the operation of gas turbine engines, particularly for the propulsion of aircraft.

Another object of the invention is to provide an improved fluid control system for gas turbine aircraft engines which automatically compensates for engine air temperature.

A further object of the invention is to provide an improved fluid control for indicating a deviation from a desired rate of operation.

To these ends a fluid control is provided in which two signals are generated, with a frequency indicating a measured parameter, such as a rate of rotation of the turbine of a gas turbine engine. When turbine rotation is at a desired rate these two signals are 90°, out of phase at a phase discriminator having two outputs. The phase discriminator has two inputs, each receiving one of the signals from the generator. The other signal from the generator is modified so that it is fed to the inputs of the phase discriminator 90° leading and 90° lagging the other signal inputs thereto. With this arrangement the averaged pressure values of the two outputs are equal, indicating that the signal generator is operating at a desired rate or frequency. This frequency is preferably established by the resonant frequency of a resonator which is incorporated in means which modify the other signal of the generator to obtain the 90° leading, lagging relation.

When the generator signal varies from the resonant frequency of the generator, the phase of the modified signal is shifted so that one input to the phase discriminator is leading by more than 90° and the other lagging by less than 90°. This develops an error signal in the form of a pressure differential between the averaged pressures in the two outputs of the phase discriminator.

In an engine control this error signal may be converted into an appropriate control signal for modifying the rate of turbine operation to match the resonant frequency of the resonator. The control lever for engine operation may be connected to means for varying the resonant frequency of the resonator to establish the rate of operation of the engine. Further, since the resonant frequency of the resonator is also a function of the fluid within a chamber and tube, the rate of engine operation can be automatically adjusted in accordance with engine gas temperature by passing engine gases through this chamber and tube.

The above and other related objects and features of the invention will be apparent from a reading of the following description of the disclosure found in the accompanying drawings and the novelty thereof pointed out in the appended claims.

In the drawings:

FIG. 1 is a diagrammatical representation, partially in section, of a fluid control embodying the present invention;

FIGS. 2, 3, 4, and 5 are plots of pressure relationships which exist in the present control; and FIG. 6 is a diagrammatical showing of the present control system as used with a gas turbine engine.

The present control comprises a sinusoidal signal generator 10 which provides two fluid pressure signals of equal magnitude which are 180° out of phase. One of these signals is fed to a resonator 12, then to a decoupler 14, through a first amplifier 16 and then to a second amplifier 18. The output from the amplifier 18 is then compared with the other output of the signal generator 10 in a phase discriminator 20 which provides an error signal in the form of an averaged pressure differential between two outputs 22 and 24. This pressure error signal may be converted to an electrical error signal by a transducer 25 indicating that the signal generator 10 has deviated from a predetermined frequency which is established by the resonator 12. The details of these components will next be described.

The signal generator 10 comprises a conduit 26 connected to a source of pressurized air. The pressurized air passes to a conduit 28 intermediate equal sized orifices 30 and then to conduits 34 and 36. One end of the conduit 34 opens to atmosphere and the other end is connected to a control jet 38 of a fluid amplifier 40. One end of the conduit 36 likewise opens to atmosphere and its other end is connected to a control jet 42 in the amplifier 40. A tilted plate 44 is secured to the end of the rotating shaft 46 and wobbles or nutates to alternatively and progressively control the escape of air from the conduits 34 and 36 in a sinusoidal fashion. This in turn causes sinusoidal pressure variations in the conduits 34 and 36 with the result that the pressures at the control jets 38 and 42 are likewise varying with an equal magnitude and 180° out of phase.

The amplifier 40 also comprises an inlet 48 which is connected to a source of pressurized air so that a power stream is constantly discharged from a power jet 50. Channels 56 provide conventional vents. The power stream is directed towards receivers 52, 54 as the power stream is deflected to and fro by the pressure differential of the control jets 38 and 42. Pressure in the receivers 52, 54 thus varies sinusoidally providing fluid pressure signals at the same frequency as the rate of rotation of the shaft 46, which signals are 180° out of phase, that is, when the pressure in receiver 52 is at a maximum value, the pressure in the receiver 54 will be at a minimum value.

Considering next the resonator 12, the receiver 54 provides an input signal thereto through a conduit 58 which connects with a chamber 60 and has a flow restricting orifice 62 therein. The chamber 60 is connected by an outlet conduit or passageway 64 to the so-called decoupler 14 and likewise has a flow restricting orifice 66 therein. A pair of tubes 68 extend from the chamber 60 and are vented to atmosphere. The dimensions of the chamber 60 and the tubes 68 and the temperature of the fluid therein establish a resonant frequency at which an input signal from the receiver 54 will provide an output signal from the outlet passageway 64 which has a maximum value and substantially no phase shift.

The decoupler 14 eliminates any steady state or slowly fluctuating pressures from the output pressure signal of the resonator 12. The decupler comprises a common input chamber 72 for receiving a pressure signal from the outlet conduit 64 of the resonator 12. From the chamber 72 the pressure signal passes to a control jet 74 through an arifice 76 and a short passageway 78. From the chamber 72 the same signal also passes through an orifice 80 into a relatively large chamber 82 and then to a second control jet 84. (The somewhat diagrammatical illustration in the drawing indicates that the chamber 82 is relatively large; it in fact can be much larger by being extended in a direction normal to the plane of the drawing.) An inlet 86 is connected to a source of pressurized air and directs a power stream from a power jet 88, towards receivers 90 and 92.

It will be apparent that the direction of the power stream will be controlled by the pressures from the control jets 74 and 84. Since the frequency of the input signal from the resonator 12 will be relatively large, the great volume of the chamber 82 will attenuate this signal so that there are no pressure variations resulting from the resonator signal which will appear at the control jet 84. On the other hand, the path to control jet 74 is relatively short so that the rapid cyclic pressure variations of this signal will be effective on the power stream to oscillate it is sinusoidal fashion so that the pressure in the receivers 92 will likewise vary in sinusoidal fashion but 180° from each other. It will be apparent that if there are any other relatively slow changes in the steady state reference pressure, they will be equally effective from the control jets 84 and 74 and have no effect on the rate of oscillation of the power stream as it swings between the receivers 90 and 92.

The amplifier 16 comprises an inlet 94 which is connected to a source of pressurized air so that a power stream is discharged from a power jet 96 towards receivers 98 and 100. Receivers 90 and 92 connect with control jets 102, 104 respectively, and are effective on the power stream to cause a sinusoidal variation in pressure in the receivers 98 and 100. The receivers 98 and 100 communicate respectively with chambers 108, 110, which in turn are respectively connected to control jets 112, 114 of the amplifier 18. Amplifier 18 further comprises an inlet 118 connected to a source of pressurized air to discharge a power stream from a power jet 120 to receivers 122, 124. Again, the pressure variations in the control jets 112, 114 cause the power stream to be alternately directed into the receivers 122, 124 creating fluid pressure signals which are 180° out of phase.

The phase discriminator 20 comprises a pair of rectifier elements 123, 125 having inlets 128, 130, respectively, which discharge fluid power streams from power jets 132, 134 towards the outlets or receivers 133, 135. The rectifier element 123 further comprises control jets 136, 138, and the rectifier 125 comprises control jets 140, 142. The control jets 136 and 142 are connected respectively to the outlets or receivers 122, 124 of the amplifier 18. The control jets 138, 140 are connected to the signal generator 10 and specifically the receiver 52 of the fluid amplifier 40.

When the pressures of the control jets 136, 138 are equal, the pressure in the receiver 133 is at a maximum, and when the pressure in the control jet 136 is increased, the power stream is deflected, reducing the pressure in the receiver 133 and similarly when the control jet 138 pressure is greater, the power stream is also deflected, again reducing the pressure in the receiver 133. The action of the rectifier 125 is similar in that the power stream will be deflected by the control jet 140 or 142 whichever is of greater pressure. Thus fluctuating pressures are developed in the receivers 133, 135. These fluctuating pressures are averaged out to a substantially steady state pressure by chambers 143, 145, connected to the receivers 133, 135 respectively, and to which the phase discriminator outputs 22 and 24 are connected.

Referring again to the resonator 12, it will be pointed out that the construction, herein shown, is more fully described and separately claimed in co-pending application Ser. No. 457,006 filed May 19, 1965 in the names of Carl G. Ringwall and Lonny R. Kelley and assigned to the same assignee as the present application. One of the characteristics of this resonator is that the size of the chamber 60 and the dimensions of the tubes 68 as well as the temperature of the fluid therein establish a resonant frequency. When the signal impressed on the resonator is at this resonant frequency, there is a maximum output signal therefrom and substantially no phase shift between the input and output signals. When the input signal to the resonator varies from this resonant frequency, the output signal is sharply attenuated and further accompanied by a phase shift which lags in the case of an increase in frequency and leads in the case of a decrease in frequency. In any event, however, the pressure signal from the resonator varies relative to a more or less steady state reference pressure.

Assuming for the moment that the shaft 46 is rotating at a frequency or rate equal to the resonant frequency of the resonator 12, a maximum signal from the resonator will be transmitted to the decoupler 14. This signal will then be amplified by the amplifiers 16 and 18 so that the magnitude of the pressure signals developed in the receivers 122 and 124 which are transmitted to the control jets 136 and 142 will preferably equal or at least approximate the strength of the pressure signal generated by the generator 10 and impressed on the opposed control jets 138 and 140.

Recognizing that as pressure signals are transmitted along the various passageways involved there will be some phase shift from the signal generator 10 to the phase dicsriminator 20, the present circuitry is dimensioned to establish a 90° phase difference between the control jets at the rectifiers 123, 125. In one case the output from the amplifier 18 will be 90° leading the signal from the generator 10, and in the other it will be 90° lagging. To balance inherent phase shifts and to obtain the 90° phase relationships desired, the chambers 108 and 110 may be initially adjustable to determine the proper dimensions which will establish the phase relationship for a given control.

FIG. 2 illustrates the pressure $P_g$ derived from the generator 10 which is impressed upon the control port 138 of the rectifier 132. Curve $P_r$ indicates the pressure signal derived from the amplifier 18 and impressed on the control jet 136. Curve $P_{g-r}$ indicates the net force resulting from the control jets which was effective to deflect the jet stream from the receiver 22 and curve $P_o$ indicates the recovered pressure measured at the receiver 133. It will be noted that when the pressures $P_g$ and $P_r$ are equal there is a maximum pressure output from the receiver 133 and that while the pressure signals attain a maximum value only once the recovered pressure attains a maximum value twice each cycle.

FIG. 3 similarly indicates the pressure $P_g$ at the control jet 140 and the pressure signal $P_r$ at the control jet 142. Curve $P_{g-r'}$ indicates the deflective force effective on the power stream from the port 134 and curve $P_{o'}$ indicates the recovered pressure from the receiver 135.

It will be apparent that by integrating the area under the curves $P_o$ and $P_{o'}$ averaged values $P_{os}$ and $P_{os'}$ can be obtained. The chambers 143, 145 perform this function so that the pressure curves $P_{os}$ and $P_{os'}$ indicate the pressures at the phase discriminator outputs 22, 24. The transducer 25 which is preferably a differential transformer would have an output signal value, preferably zero value, indicating this balanced condition.

To this point it has been assumed that the input frequency cycle equals that of the resonant frequency of the resonator 12. Assuming now that the input frequency cycle is reduced below this value there will be a phase shift between the input and the output signals at the resonator 12 (as more fully explained in the above-mentioned application). This phase shift is reflected at the control jets 136 and 142 and is illustrated in FIGS. 4 and 5. Again in FIG. 4, curve $P_g$ indicates the signal impressed upon the control jet 138 and $P_r$ indicates the signal impressed upon the control at 136. Curve $P_{g-r}$ indicates the net effective deflecting force on the power stream from the power jet 132 and curve $P_o$ indicates the recovered pressure at the receiver 133. Similarly FIG. 5 illustrates the signal input $P_g$ at the control jet 140 and curve $P_{r'}$ indicates the signal impressed upon the control jet 142. Curve $P_{g-r'}$ indicates the net deflecting force on the power stream from the power jet 134. It will be noted that the power stream from jet 132 is deflected to a much greater extent than the power stream from the jet 134. Therefore, the recovered pressure in the receiver 135 is maintained at a higher average value than the recovered pressure from the receiver 133. This differential is reflected by the outputs $P_{os}$ and $P_{os'}$ acting on the transducer 25 to produce an error signal which indicates not only that there is a difference between the signal generator frequency and the resonant frequency of the resonator 12, but by reason of its polarity indicates that the error results from the speed of the shaft 46 being below the resonant frequency of the resonator 12 Conversely, if the speed of the shaft 46 exceeded the resonant frequency of resonator 12, the average recovered pressure in the receiver 133 would be greater than the average recovered pressure in receiver 135 and the transducer would develop an error signal of opposite polarity indicating both magnitude and direction of the error between the generator input signal and the reference frequency established by the resonator 12.

Reference is now made to FIG. 6 which illustrates the above-described control circuit incorporated in a control system for a gas turbine engine 150. The signal generator 10 is mechanically connected to the turbine 150 of the engine axial flow compressor 153 so that the frequency of the fluid signal generated thereby has a frequency corresponding to the rate of rotation of the turbine. The signal $P_g$ again goes to the phase discriminator 20 and the other output from the signal generator 10 goes to a modified resonator 12'. The resonator 12' is modified to the extent that a cylinder 152 is provided with a piston 154 slidable therein. The piston 154 is mechanically connected to a control lever 156 corresponding to the control lever normally employed to control the rate of operation of a gas turbine engine. The piston 154 varies the volume of the resonator chamber 60 to thus vary the resonant frequency thereof. The angular adjustment of the control lever 156 thus establishes a desired rate of operation of the engine 150 in accordance with the resonant frequency of the resonator 12'.

As thus far described, the present control system corresponds to that previously described, in that the lever 156 will be set to a desired position, and once the rate of operation of the turbine 10 is such that the frequency of the signal generator 10 matches the resonant frequency of the resonator 12', the signals $P_g$ and $P_r$, $P_{r'}$, will have the 90° leading, lagging relationship described in connection with FIGS. 2 and 3. The output from the transducer 25 is zero, indicating that a fuel control 158 which is responsive to signals from the transducer 25 is passing the proper amount of fuel through line 160 to a combustor means 162 to drive the engine at the desired speed setting. Should the turbine speed be above or below the desired speed as determined by the resonant frequency of the resonator 12', there will be an output signal from the transducer 25 which will modify the fuel control 158 to adjust fuel flow in the combustor 162 to either reduce or increase the rate of engine operation and attain a nulling of the error signal, as the speed of the engine is brought to desired speed.

It is further desired that the rate of operation of the engine 150 be modified as a function of the temperature of the air entering the compressor 153. To this end a conduit 166 is provided which conveys inlet ambient air to the resonator12'. This air constantly flows through one of the tubes 68 and out the other tube 68. To assist in a continuous flow of air an aspirator 168 may be provided on the other of the tubes 68. As previously indicated, the resonant frequency of the resonator is a function of temperature of the fluid or air therein. By constantly passing compressor inlet air through the chamber 60 the natural frequency of the resonator is varied as a function of this air temperature, so that for a given setting of the throttle lever 156 the rate of operation of the engine is automatically adjusted in accordance with air inlet temperature.

Variations from the specific embodiments herein described will be apparent to those skilled in the art and the scope of the invention is therefore to be derived from the following claims.

Having thus described the invention, what is claimed as novel and desired to be secured by Letters Patent of the United States is:

1. A fluid control system for a gas turbine engine, said system comprising,
   a fluid signal generator driven from the engine turbine and producing a fluid pressure signal having a frequency reflecting engine speed,
   means including a resonator having a resonant frequency for generating an error signal when the fluid pressure signal frequency deviates from said resonant frequency,
   means responsive to said error signal for modifying the rate of operation of said engine to bring the fluid pressure signal frequency to the rate of said resonant frequency,
   a control lever,
   means responsive to the position of said control lever for adjusting the resonant frequency of said resonator to thereby determine the rate of operation of said engine.

2. A control system as in claim 1 wherein,
   the resonator comprises a chamber and its resonant frequency is a function of the temperature of fluid therein, and
   further wherein,
   means are provided for passing fluid from said engine through said chamber whereby the rate of operation of the engine is automatically varied as a function of the temperature of fluid therefrom.

3. A fluid control comprising,
   a fluid pressure reference signal,
   means for generating two fluid pressure signals 180° out of phase,
   a phase discriminator,
   means for transmitting said two signals to the phase discriminator 90° out of phase when the frequency of said signals matches the reference signal,
   said transmitting means shifting the phase relationship between the two signals from said 90° difference when the fluid signals deviate from the reference signal frequency,
   said phase discriminator being responsive to other than a 90° phase differential between the two signals to generate an error signal.

4. A fluid control comprising,
   means for generating two sinusoidal input fluid pressure signals of relatively high frequency of equal magnitude and 180° out of phase,
   a phase discriminator comprising a pair of fluid pressure rectifiers each having a power stream and a receiver therefor and a pair of opposed control jets effective on said power stream to deflect it from the receiver, means for connecting one of said input signals to one of the control jets of each of said rectifiers with no substantial phase shift from the generator, means for connecting the other input signal to the other control jet of each rectifier, said other connecting means including, a resonator receiving the other input signal, a decoupler connected to the output of said resonator, said resonator having a resonant frequency at which there is a fixed phase relation of said other input signal from the generator to the decoupler, said decoupler being responsive to the relatively high frequency of the output of said generator to produce two intermediate fluid pressure signals 180° out of phase, fluid pressure amplifier means for amplifying said intermediate signals to the approximate strength of said one input signal at the control jets of the phase discriminators, and means for introducing a 90° phase shift in said other input signal between the signal generator and the inputs to the phase discriminator when the frequency of the input signals matches the resonant frequency of the resonator, whereby the other input signal will lead said one input signal by 90° at one of the fluid rectifiers and lag said one signal by 90° at the other fluid rectifier, whereby the averaged pressures at the two rectifier outputs will be equal and be unequal when the input signals deviate from said resonant frequency and a result of a phase shift introduced by the resonator.

5. A fluid control system comprising, means for generating two signals having pressure variations therein which progressively increase and decrease in the same incremental manner and at the same frequency, a phase discriminator comprising a power stream, receiver means downstream thereof and a pair of opposed control jets effective on said power stream to control its deflection relative to the receiver means, means for respectively connecting said signals to said control jets, said connecting means including means for establishing, at a given frequency, a 90° phase differential between the signals at said control jets and causing other than a 90° phase shift at other than said given frequency, and means responsive to variations in said receiver means pressure other than when there is a 90° phase shift between the signal inputs thereto for providing an error signal.

6. A fluid control system as in claim 5 wherein, the phase discriminator comprises a second power stream, second receiver means downstream thereof, and a second pair of control jets effective on said second power stream to control its deflection relative to it receiver means, and means for respectively connecting said signals to said second control jets, said second connecting means including means for maintaining one of said signals in the same phase relationship as one signal effective on said first power stream and, at said given frequency, establishing a 180° phase differential relative to the other signal effective on said first power stream, and the means for providing an error signal include means for detecting a pressure differential between the two receiver means.

References Cited

UNITED STATES PATENTS

| 3,248,043 | 4/1966 | Taplin. | |
| 3,260,271 | 7/1966 | Katz | 137—36 |
| 3,292,648 | 12/1966 | Colston | 137—36 |

CLARENCE R. GORDON, Primary Examiner

U.S. Cl. X.R.

60—39.28; 137—36, 81.5